L. NORMAN.
AUTOMOBILE SLEIGH.
APPLICATION FILED NOV. 18, 1904.

996,119.

Patented June 27, 1911.

3 SHEETS—SHEET 1.

Witness
Farnum F. Dorsey
Alfred H. Hildreth

Inventor
Lionel Norman
by his Attorneys
Phillips Van Everen & Fish

L. NORMAN.
AUTOMOBILE SLEIGH.
APPLICATION FILED NOV. 18, 1904.

996,119.

Patented June 27, 1911.

3 SHEETS—SHEET 2.

Witness
Farnum F. Dorsey
Alfred N. Hildreth

Inventor
Lionel Norman
By his Attorneys
Phillips Van Everen & Fish

L. NORMAN.
AUTOMOBILE SLEIGH.
APPLICATION FILED NOV. 18, 1904.
996,119.
Patented June 27, 1911.
3 SHEETS—SHEET 3.
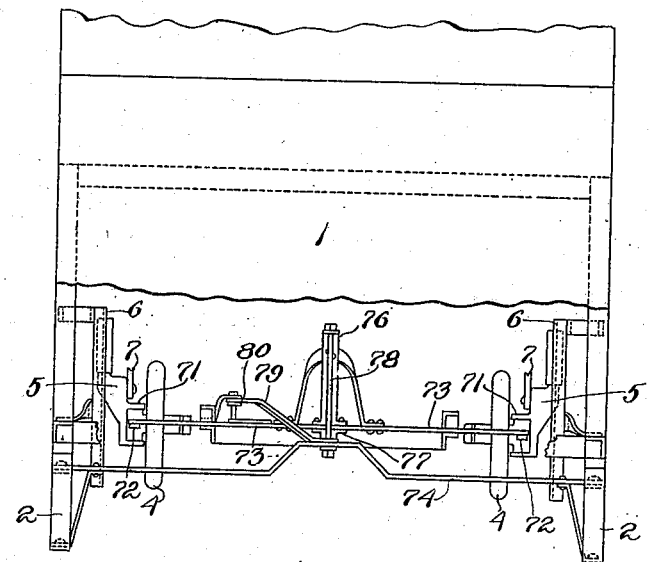
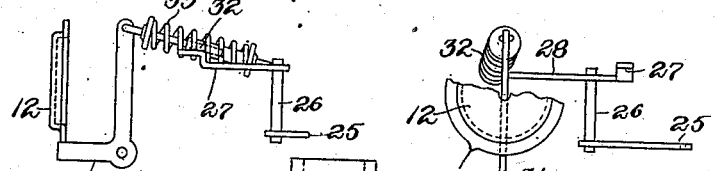
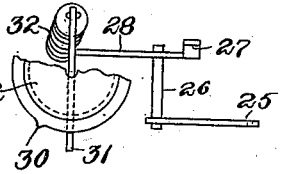
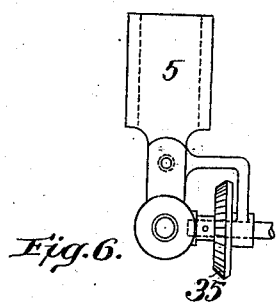
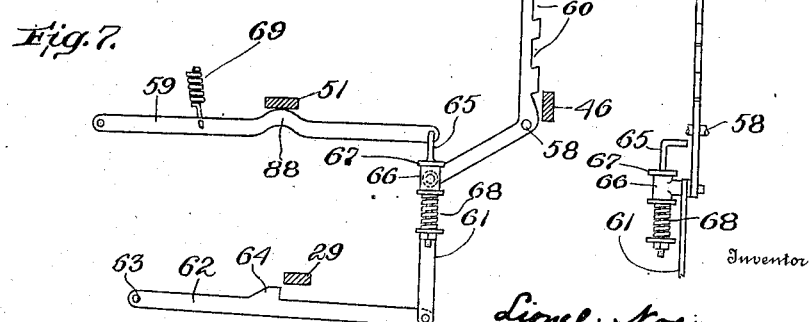

UNITED STATES PATENT OFFICE.

LIONEL NORMAN, OF BROOKLINE, MASSACHUSETTS.

AUTOMOBILE SLEIGH.

996,119.  Specification of Letters Patent.  Patented June 27, 1911.

Application filed November 18, 1904. Serial No. 233,243.

*To all whom it may concern:*

Be it known that I, LIONEL NORMAN, a citizen of the United States, residing at Brookline, in the county of Norfolk and State of Massachusetts, have invented certain new and useful Improvements in Automobile Sleighs; and I do hereby declare the following to be a full, clear, and exact description of the invention, such as will enable others skilled in the art to which it appertains to make and use the same.

The present invention relates to automobile sleighs, and its object is to produce an automobile sleigh provided with wheels, or other devices for supporting the sleigh when the road surface is unsuitable for the use of runners, and with improved means for throwing the wheels into or out of operation according to the condition of the road surface, and for actuating the wheels or other devices when in use to propel and steer the sleigh.

A further object is to provide an automobile sleigh driven by an engine with means for utilizing the waste heat of the engine in warming the occupants of the sleigh.

To the above ends the invention consists in the automobile sleigh hereinafter described and defined in the claims.

Figure 1:
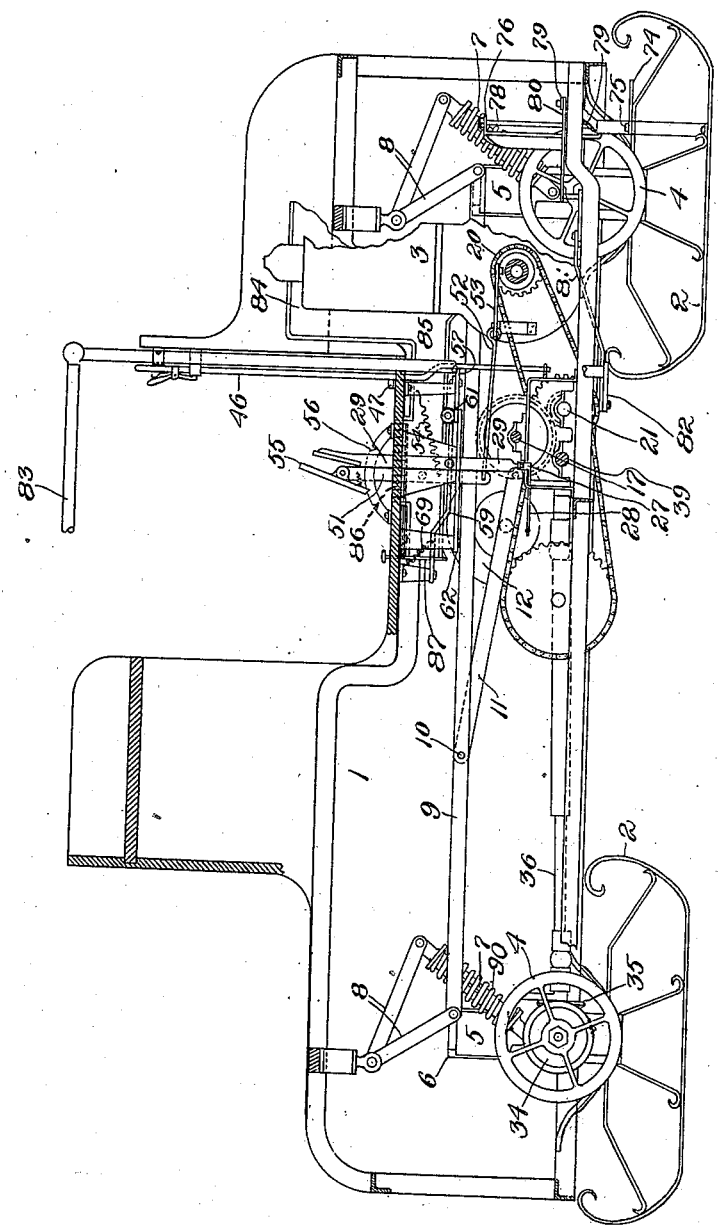
Figure 6:
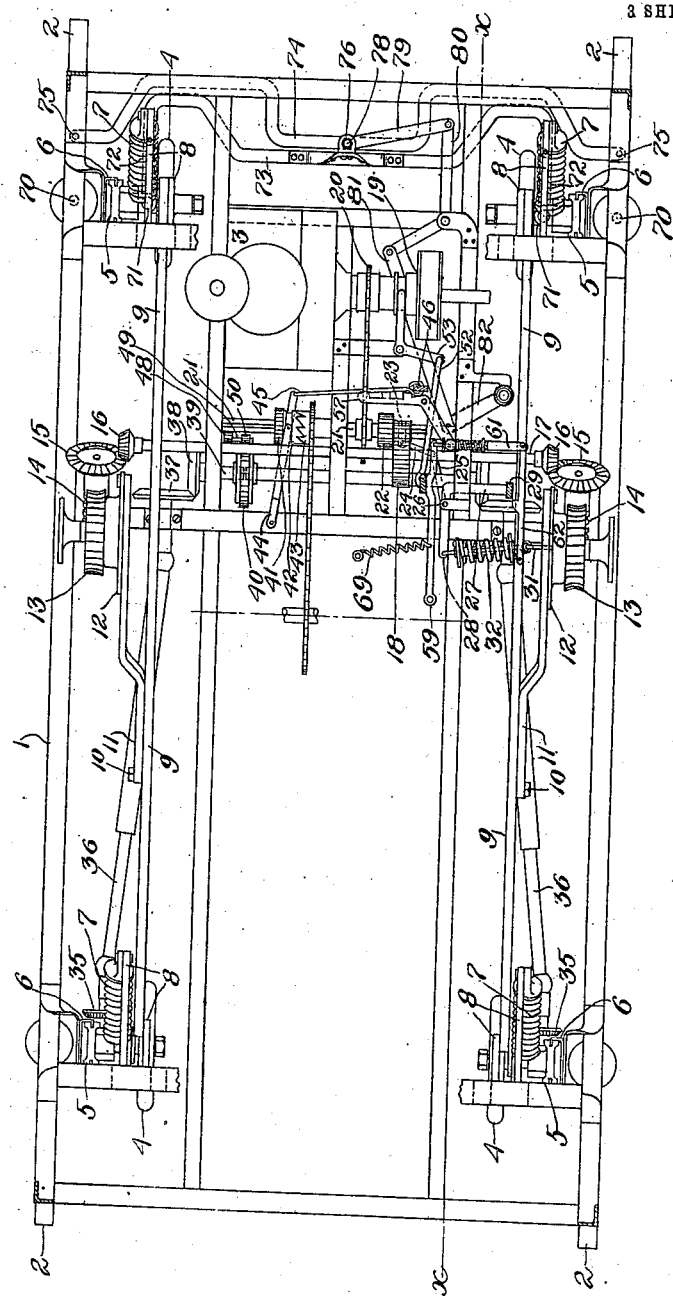

In the drawings Figure 1 is a vertical longitudinal section on line x—x, Fig. 2, of a sleigh embodying the present invention, and Fig. 2 is a plan view partly in section. Fig. 3 is a front view showing the front wheels and runners and the steering mechanism connected therewith. Figs. 4 and 5 are details of the mechanism for throwing the wheel-lowering and raising means out of operation. Fig. 6 is a detail of one of the slide blocks on which the rear wheels are mounted. Figs. 7 and 8 are details of the control lever locking mechanism.

The illustrated embodiment of the invention, with the exception of the novel features hereinafter described, is constructed in accordance with the specification of the pending application for Letters Patent of the United States, Serial No. 212,100, filed June 11, 1904, by the present applicant, and as the pushing devices for propelling the sleigh when it is supported by its runners are fully described in the said application, they are not shown in the drawings accompanying the present application.

The body 1 of the sleigh is supported upon runners 2, and carries an engine 3 of any suitable type for actuating the power mechanism by which the vehicle is propelled and by which the wheels are thrown into and out of operative position. The wheels 4 are shown in the drawings in their raised or inoperative position, the sleigh being supported upon its runners. The axles of the wheels are secured to slide blocks 5 moving vertically in guides 6 fixed to the frame of the body so that the wheels may be lowered until they are in contact with the road surface and the runners are raised therefrom.

The means for lowering and raising the wheels are constructed as follows:—Each slide block 5 is connected by a link 7 with a bell crank lever 8. The bell crank levers on each side are connected by links 9. To each link 9 is pivotally secured at 10 a connecting rod 11 which is pivotally connected with a disk 12 journaled on a shaft fixed in the frame of the sleigh. To the disks are secured worm gears 13 meshing with worms 14 which are rotated by bevel gears 15 and 16, the latter fixed on a shaft 17 journaled on the frame of the sleigh. The shaft 17 has keyed thereto a gear 18. The engine 3 transmits power through a clutch 19 and a sprocket chain 20 to a countershaft 21 journaled in the frame of the sleigh. A pinion 22 splined to the countershaft is connected by means of a strap 23 and a link 24 to an arm 25 on the lower end of a short vertical shaft 26 journaled in the frame of the sleigh. Upon the upper end of the shaft is a bell crank lever having arms 27 and 28, the first of which is connected with a pedal lever 29 pivoted on the frame of the sleigh. When the pedal is pushed forward by the operator the pinion 22 is moved laterally into engagement with the gear 18 and power is transmitted through the above described connections to rotate the disks 12, and such rotation continuing throughout a half revolution of the disks moves the wheels from their extreme upper position to their extreme lower position, or vice versa.

In order to support the sleigh yieldingly upon the wheels the links 7 are made in two telescopic sections connected by springs 90 which permit the wheels to yield to inequalities in the road surface.

In order to arrest the movement of the disks at the end of a half revolution each disk has upon its periphery a cam projection 30 (see Fig. 5), which engages a horizontal arm of a bell crank lever 31, the upper end of which is connected by means of a link 32 with the arm 28 of the bell crank lever before mentioned. When the disk is moved through a half revolution the cam projection, through the connections described, throws the pinion 22 out of engagement with the gear 18 and interrupts the movement of the disks. As the movement of the disks is arrested at the moment when the cam projection is in engagement with the bell crank lever 31 it is necessary to arrange the connections between the bell crank lever and the pinion to yield somewhat when it is desired to set the mechanism again in operation by the pedal, and to this end the link 32 is made in two telescoping portions connected by a spring 33 which permits it to yield to a sufficient pressure upon the pedal, and the pedal is held down until the movement of the cam projection has released the bell crank lever.

In order to propel the sleigh when it is supported upon the wheels, connections between the motor and the rear wheels are provided for actuating the latter. A bevel pinion 34 is secured to each rear wheel and is engaged by a pinion 35 connected by means of a shaft 36 with bevel gears 37 and 38, the latter fixed upon a shaft 39 journaled in the frame of the sleigh. The shafts 36 have universal joints and telescopic portions to permit the necessary angular and longitudinal adjustment under the various positions of the wheels. The shaft 39 carries a gear 40 which may be connected thereto by suitable differential gearing. Upon the countershaft 21 is splined a pinion 41 which is formed integral with a clutch member 42 engaging a corresponding member 43 which is free to rotate upon the shaft 21, and is connected by means of a chain and sprocket with the pushing devices (not shown) for propelling the sleigh when supported upon its runners. In the drawings the clutch members are in engagement, but by means of suitable connections, including a lever 44 carrying a roller engaging an annular groove in the clutch member 42, a link 45 and a hand lever 46 pivoted at 47 on the frame of the sleigh, the pinion 41 may be thrown into engagement with the gear 40 so as to disengage the clutch members and actuate the wheels through the connections above described. By a further movement in the same direction the pinion 41 is brought into engagement with a pinion 48 fixed to a shaft 49 carrying a pinion 50 engaging the gear 40. Through these means the direction of rotation of the gear wheels is reversed and the vehicle is driven backward. In order to disconnect the engine from the countershaft 21 when the gears are to be thrown into or out of engagement, the clutch 19 is thrown out of operation by means of a pedal 51 which is connected with the clutch by a link 52 and a bell crank lever 53, the latter carrying a pin or roller engaging an annular groove in one member of the clutch in the usual manner. The clutch pedal is normally thrown back by a spring 54 and is retained in its several positions by the engagement of the pivoted upper portion 55 with notches in a segment 56.

Automatic locking means are provided for preventing the operator throwing into operation the raising and lowering means for the wheels or shifting the driving gears without previously throwing out of operation the clutch 19. A lever 57 (see Fig. 7) pivoted at 58 on a standard carried by the frame of the sleigh is connected with the free end of a lever 59 pivoted upon the frame of the sleigh. The lever 57 has a locking arm with notches 60 arranged to engage the hand lever 46 and lock it in the positions corresponding to each operative position of the pinion 41 and clutch member 42. The lever 59 has a cam projection 88 arranged to be engaged by the pedal lever 51 when the latter is in position to throw the clutch 19 out of operation, and under such circumstances the locking arm of the lever 57 will be thrown to the left out of operative position as shown in Fig. 2, so as to release the hand lever 46. By means of a link 61 the lever is connected also with a lever 62 pivoted at 63 upon the frame of the sleigh, and this lever carries a detent 64 arranged to engage the pedal lever 29 and prevent it from moving to throw the gears 18 and 22 into engagement except when the cam projection 88 is engaged by the pedal lever 51.

After the clutch has been thrown out and the pedal 29 has been operated to throw the raising or lowering means into operation it may sometimes be desirable to throw the clutch 19 into operation before the raising or lowering movement of the wheels has been completed, and to permit the pedal lever in such a case to pass back over the detent 64 when the raising or lowering movement is completed yielding means are introduced between the link 61 and the lever 59. As shown in Figs. 7 and 8 the lever 59 is connected to a stem 65 passing loosely through a stud 66 upon which the link 61 and lever 57 are pivoted, and the relative movements of the stem and stud are controlled by a collar 67 and a spring 68 which permit the lever 62 to be moved without corresponding movement of the lever 59, the latter being held in position by a spring 69 which is strong enough to be unaffected by compression of the spring 68.

In order to steer the vehicle both the forward runners and the front wheels are pivotally connected with the body of the sleigh, the former at 70 and the latter by means of knuckle joints 71 by which the axles of the front wheels are connected with the sliding blocks 5. Each front axle carries a forwardly projecting arm 72 and these arms are connected by a bent rod 73 pivoted upon the forward ends. A connecting rod 74 is pivoted at 75 upon the runners in front of their pivotal connections with the body. The rod 73 has brackets 76 and 77 supporting a vertical rod 78 which passes through a hole in the rod 74. This permits the wheels and the rod 73 to move up and down relatively to the rod 74 while keeping the two rods always in connection through the rod 78. A link 79 pivoted upon the rod 78 is connected with a bell crank lever 80 pivoted on the frame of the sleigh and connected by a link 81 with an arm 82 fixed to the lower end of the steering column which carries in its upper end a hand lever 83 for steering the sleigh.

As the sleigh is designed to operate in cold weather it is desirable to provide it with means for warming the occupants, and to this end the waste heat of the engine is utilized by surrounding the cylinder of the engine with a jacket 84 to collect the air warmed by contact with the cylinder. The front of the jacket is open so that the current of air produced by the movement of the sleigh flows into the jacket and out at the bottom thereof through a trunk 85 which is arranged to carry the air beneath the foot board, through which it passes by a suitable opening or register 86. The delivery of hot air may be governed by a gate 87 through which the air may be permitted to escape into the body of the sleigh when it is not desired for heating.

The present invention is not limited to the precise construction shown and described, but may be embodied in other forms broadly defined in the claims.

Having now described my invention what I claim is:—

1. An automobile sleigh, having, in combination, a body, a source of power carried thereby, runners and wheels for supporting the body, and mechanism actuated by the source of power acting, under control of the operator, to move the runners out of and the wheels into, or the runners into and the wheels out of, operative position to support the sleigh.

2. An automobile sleigh, having, in combination, a body, runners and wheels for supporting the body, a source of power carried thereby for propelling the sleigh, means acting under the control of the operator for raising and holding all of the runners out of contact with the road surface, pivotal connections between at least one of the wheels and the body, and steering mechanism under the control of the operator for turning said wheel about the pivotal connections to steer the sleigh.

3. An automobile sleigh, having, in combination, a body, a source of power carried thereby, runners upon which the body is normally supported, vertically movable wheels carried by the body, and connections between the wheels and the source of power for moving the wheels into or out of contact with the road surface.

4. An automobile sleigh having, in combination, a body, a source of power carried thereby, runners upon which the body is normally supported, vertically movable wheels carried by the body, means acting under the control of the operator for moving the wheels into and the runners out of contact with the road surface, and connections between the wheels and the source of power for rotating the wheels to propel the sleigh.

5. An automobile sleigh, having, in combination, a body, a source of power carried thereby for propelling the sleigh, runners supporting the body, movable wheels carried by the body, means for moving the wheels into or out of contact with the road surface, pivotal connections between at least one of the wheels and the body, and manually-operated means for turning said wheel about such connections to steer the sleigh.

6. An automobile sleigh, having, in combination, a body, a source of power carried thereby for propelling the sleigh, means for supporting the body comprising runners and wheels, pivotal connections between the runners and wheels and the body, manually operated steering mechanism for turning the wheels and the runners about their pivotal connections with the body to steer the sleigh, and means for moving one of said supporting means out of contact with the road surface.

7. An automobile sleigh, having, in combination, a body, runners and wheels operative alternatively for supporting the body, means for lowering and raising the wheels to throw them into or out of operation, power mechanism for actuating the wheels to propel the sleigh, and steering mechanism connected with the wheels to steer the sleigh.

8. An automobile sleigh, having, in combination, a body, runners and wheels for supporting the body, power mechanism for driving the sleigh, and means for lowering and raising the wheels into and out of contact with the road surface, the said raising and lowering means being constructed and arranged so that they cannot be thrown into operation until the operation of the power mechanism is interrupted.

9. An automobile sleigh, having, in combination, a body, runners and wheels for supporting the body, an engine carried by the body, connections between the engine and the wheels, for propelling the sleigh, including a clutch, means for raising and lowering the wheels, and means for preventing the raising and lowering means from being thrown into operation when the clutch is in operative position.

10. An automobile sleigh, having, in combination, a body, runners and wheels for supporting it, power mechanism, and connections between the power mechanism and the wheels for raising and lowering the wheels, the said connections including springs to permit the wheels to yield to inequalities in the road surface.

11. An automobile sleigh, having, in combination, a body, runners and wheels for supporting it, means for raising and lowering the wheels, power mechanism, and flexible connections between each wheel and the power mechanism.

12. An automobile sleigh, having, in combination, a body, a plurality of supporting means therefor, power mechanism, means for lowering or raising one of said supporting means into or out of operative position, manually operated means for throwing said raising and lowering means into operative connection with the power mechanism, and automatic means for interrupting the operation of the raising and lowering means when the supporting means actuated thereby have reached their highest or lowest position.

13. An automobile sleigh, having, in combination, a body, a source of power carried thereby, runners and wheels for supporting the body, means actuated by the source of power for raising the runners out of contact with the road surface, and connections between the source of power and wheels for rotating the latter to propel the sleigh.

14. An automobile sleigh, having, in combination, a body, a source of power carried thereby, runners and wheels for supporting the body, means actuated by the source of power for raising the runners out of contact with the road surface, pivotal connections between the wheels and the body, and steering mechanism for turning the wheels about the pivotal connections to steer the sleigh, substantially as described.

15. A self-propelled vehicle, having, in combination, a body, runners and wheels for supporting the body, a source of power carried by the body for propelling the vehicle, means under the control of the operator for throwing the runners or the wheels into operative position to support the body, and steering mechanism under the control of the operator for directing the vehicle.

16. A self-propelled vehicle, having, in combination, a body, runners and wheels for supporting the body, a source of power carried by the body for propelling the vehicle, connections between said source of power and one of said wheels, means under the control of the operator for raising and holding the runners out of contact with the road surface, and steering mechanism under the control of the operator for directing the vehicle.

In testimony whereof I affix my signature, in presence of two witnesses.

LIONEL NORMAN.

Witnesses:
 FARNUM F. DORSEY,
 FRED O. FISH.

Copies of this patent may be obtained for five cents each, by addressing the "Commissioner of Patents, Washington, D. C."